US 12,085,704 B2

(12) United States Patent
Masuya et al.

(10) Patent No.: US 12,085,704 B2
(45) Date of Patent: Sep. 10, 2024

(54) MICROSCOPIC IMAGE CAPTURING METHOD AND MICROSCOPIC IMAGE CAPTURING DEVICE

(71) Applicant: Hitachi High-Tech Corporation, Tokyo (JP)

(72) Inventors: Akira Masuya, Tokyo (JP); Tadao Yabuhara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 243 days.

(21) Appl. No.: 17/802,350

(22) PCT Filed: Mar. 9, 2020

(86) PCT No.: PCT/JP2020/010101
§ 371 (c)(1),
(2) Date: Aug. 25, 2022

(87) PCT Pub. No.: WO2021/181482
PCT Pub. Date: Sep. 16, 2021

(65) Prior Publication Data
US 2023/0100225 A1 Mar. 30, 2023

(51) Int. Cl.
*G02B 21/36* (2006.01)
*G02B 7/36* (2021.01)
(Continued)

(52) U.S. Cl.
CPC ......... *G02B 21/361* (2013.01); *G02B 21/244* (2013.01); *G02B 21/26* (2013.01); *G02B 7/365* (2013.01)

(58) Field of Classification Search
None
See application file for complete search history.

(56) References Cited

U.S. PATENT DOCUMENTS

| 2008/0204738 A1 | 8/2008 | Schupp et al. |
| 2019/0204536 A1 | 7/2019 | Matsubara |
| 2020/0271914 A1* | 8/2020 | Matsubara ........... G02B 21/245 |

FOREIGN PATENT DOCUMENTS

| JP | 08-248100 A | 9/1996 |
| JP | 2000-294608 A | 10/2000 |

(Continued)

OTHER PUBLICATIONS

International Search Report, PCT/JP2020/010101, May 19, 2020, 2 pgs.
(Continued)

*Primary Examiner* — Xiaolan Xu
(74) *Attorney, Agent, or Firm* — Volpe Koenig

(57) ABSTRACT

A microscopic image capturing method includes: emitting a light beam from a light beam light source; detecting a spot image by a camera or a photodiode; focusing the spot image by an objective lens actuator moving an objective lens in the optical axis direction of the light beam with respect to a sample container; determining by a reflective surface identification unit whether the light beam has been applied to a defect on the basis of the spot image; when it is determined that the light beam has been applied to the defect, moving by an XY stage the sample container with respect to the objective lens in a direction orthogonal to the optical axis of the light beam in accordance with a prescribed condition; and, when the light beam has not been applied to the defect, capturing a microscopic image of a sample by using an illuminator.

13 Claims, 12 Drawing Sheets

(51) Int. Cl.
    *G02B 21/24*    (2006.01)
    *G02B 21/26*    (2006.01)

(56)            References Cited

FOREIGN PATENT DOCUMENTS

| JP | 2001-280952 A | 10/2001 |
| JP | 2001-305420 A | 10/2001 |
| JP | 2018-216248 A | 9/2008 |
| JP | 2018-54968 A | 4/2018 |
| WO | 2019/098018 A1 | 5/2019 |

OTHER PUBLICATIONS

Japanese Office Action issued on Mar. 14, 2023 for Japanese Patent Application No. 2022-507017.

* cited by examiner

[FIG. 2]
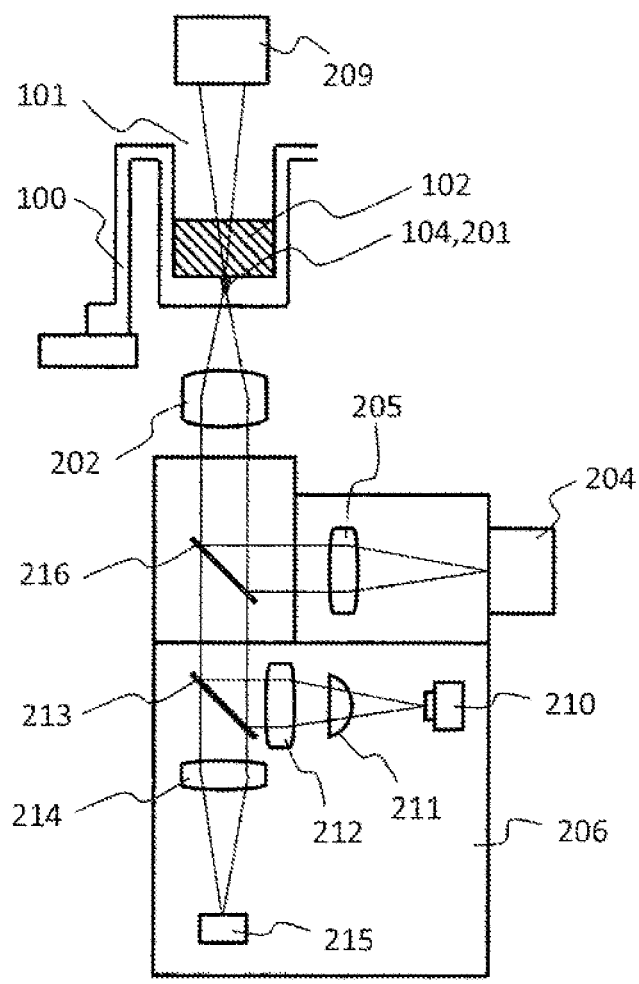

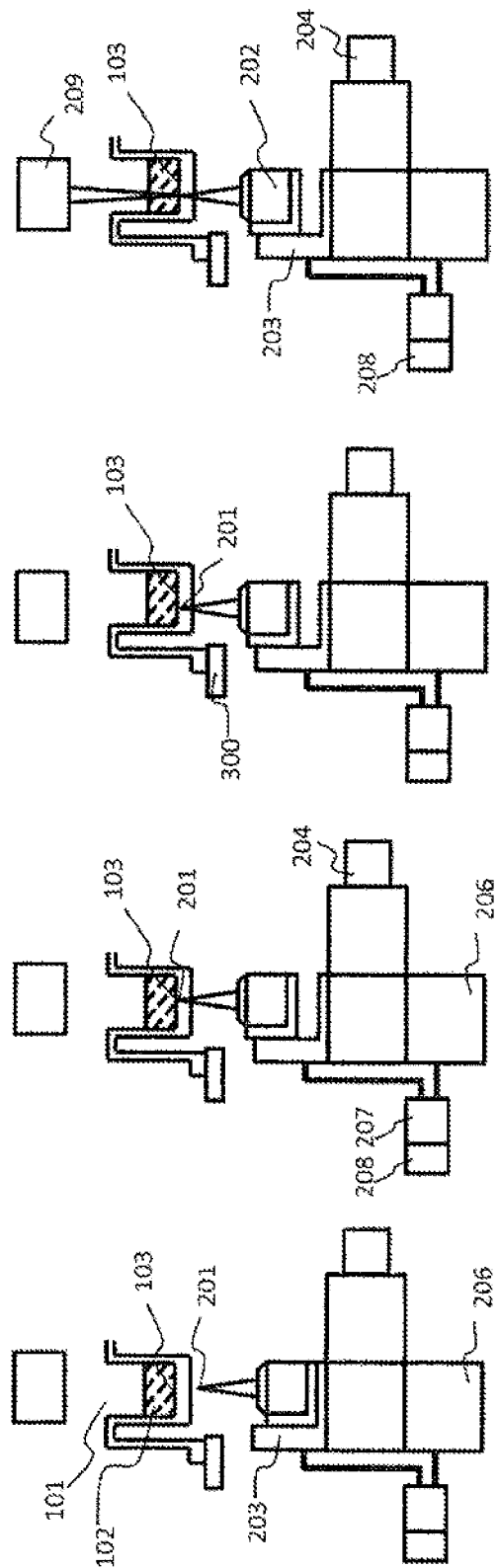

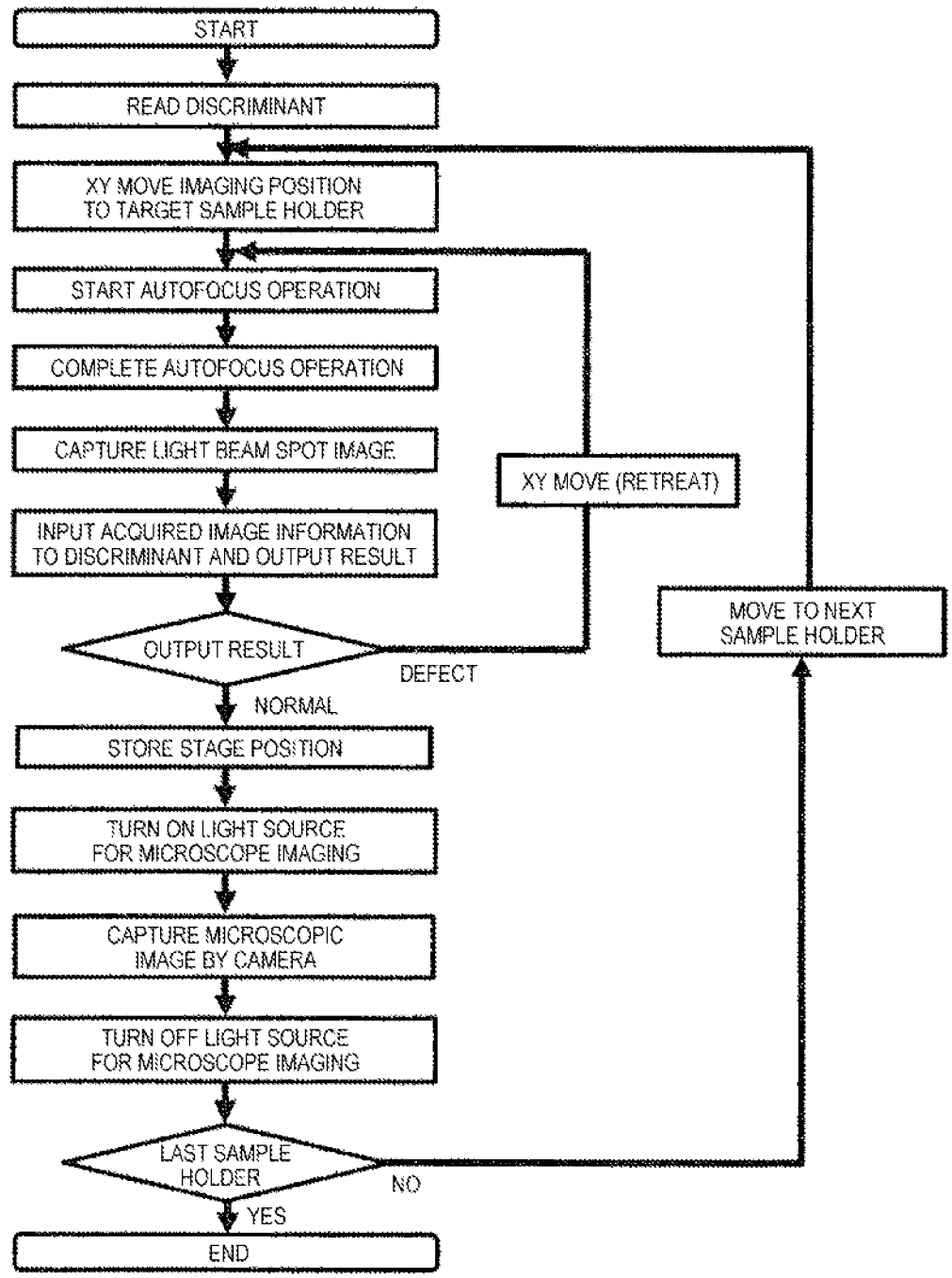
[FIG. 4]

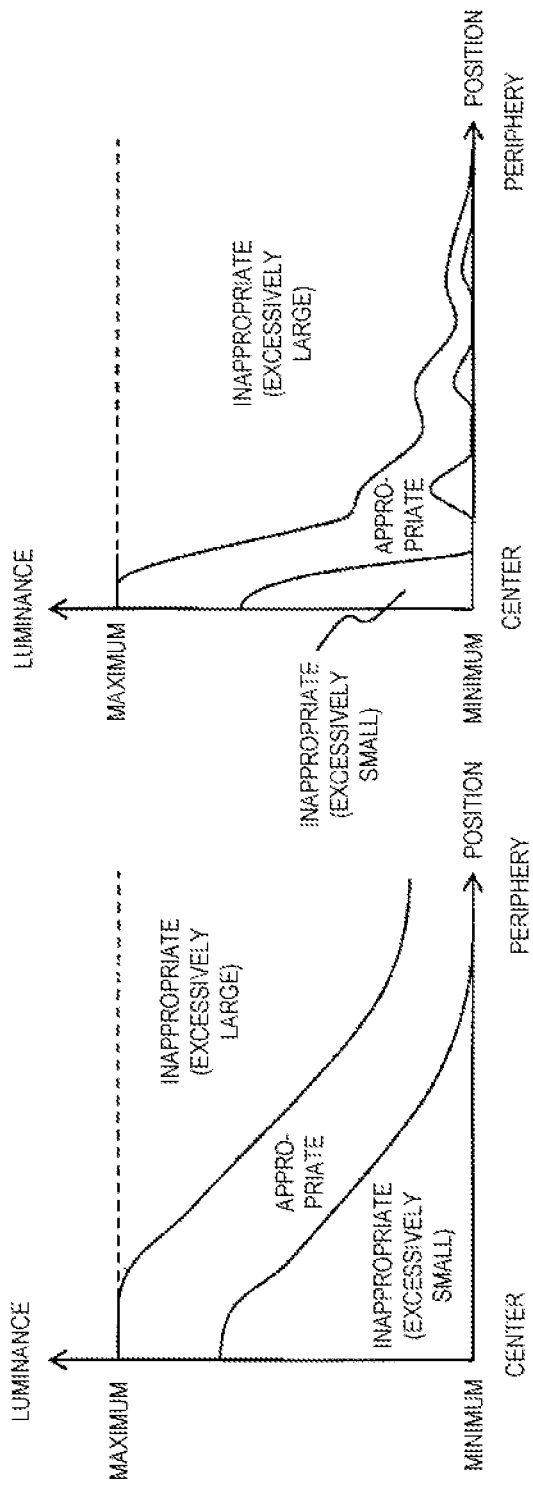

[FIG. 8]
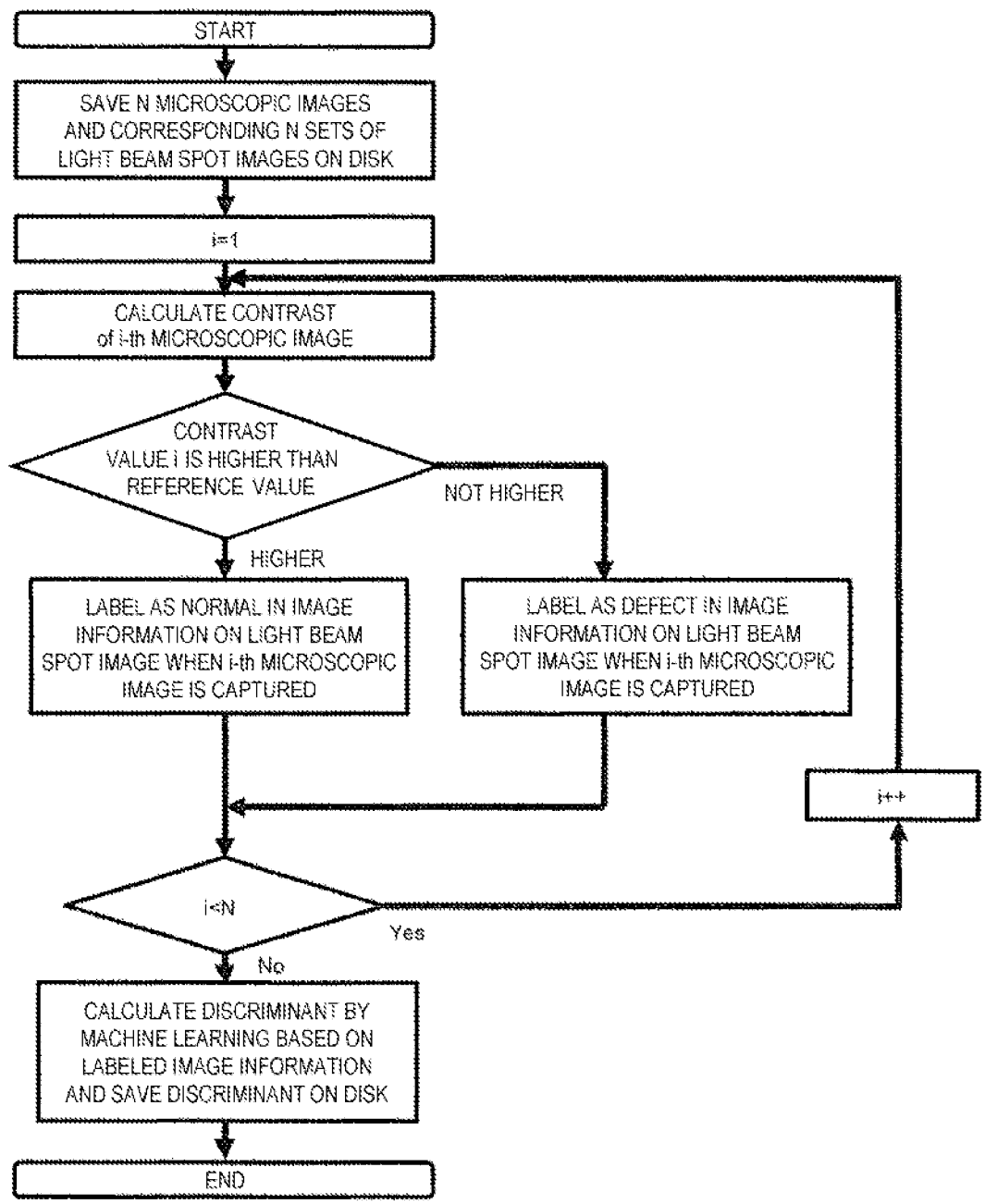

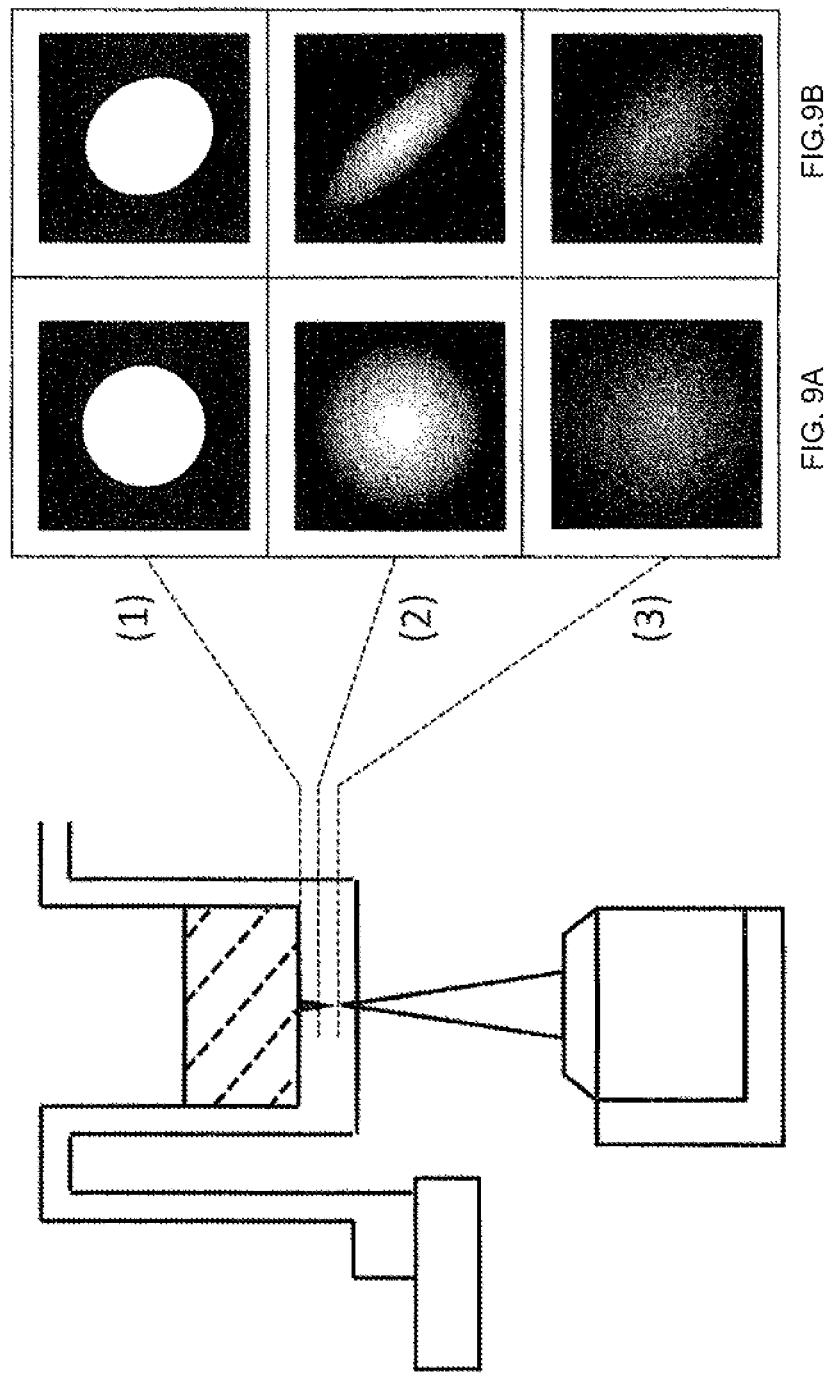

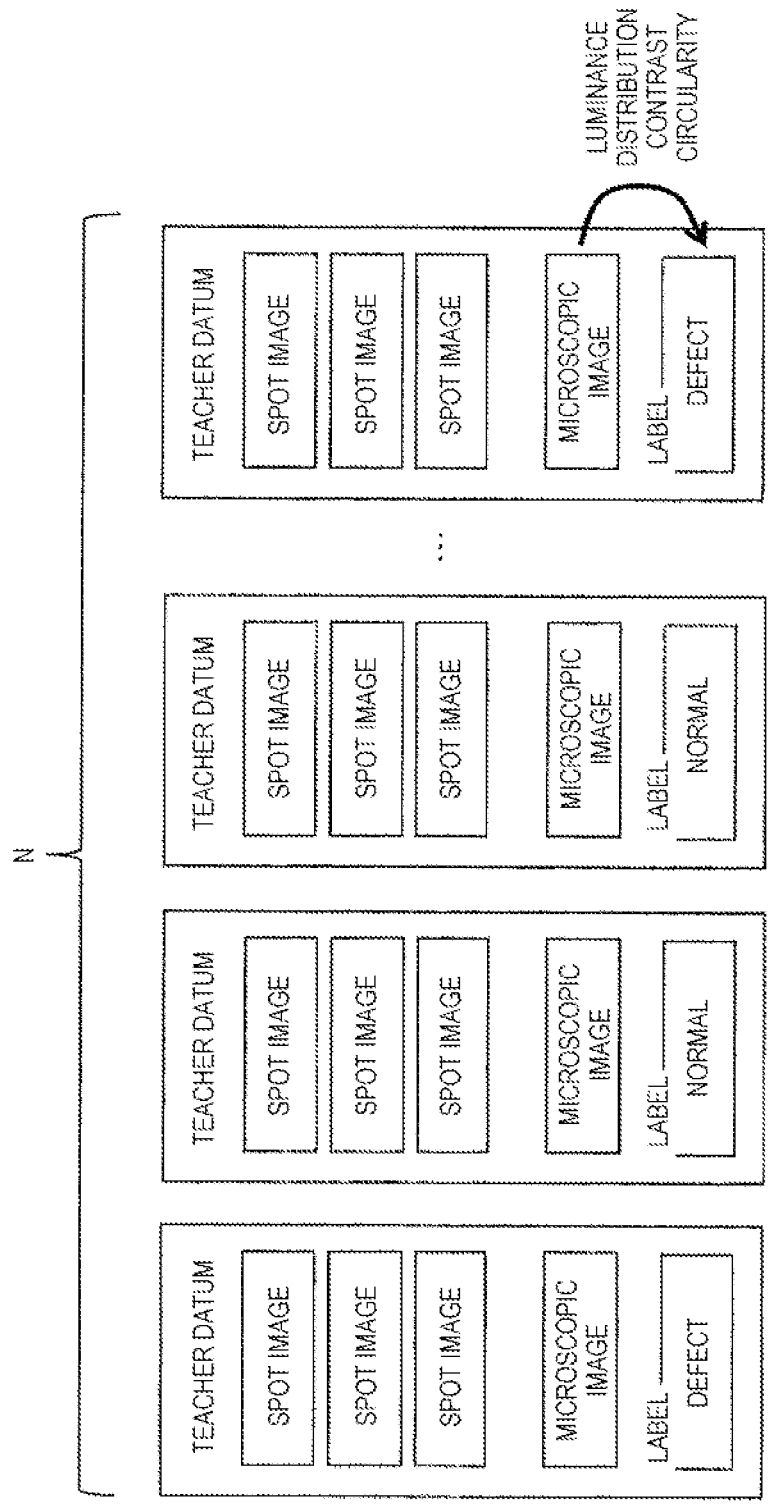

[FIG. 11]
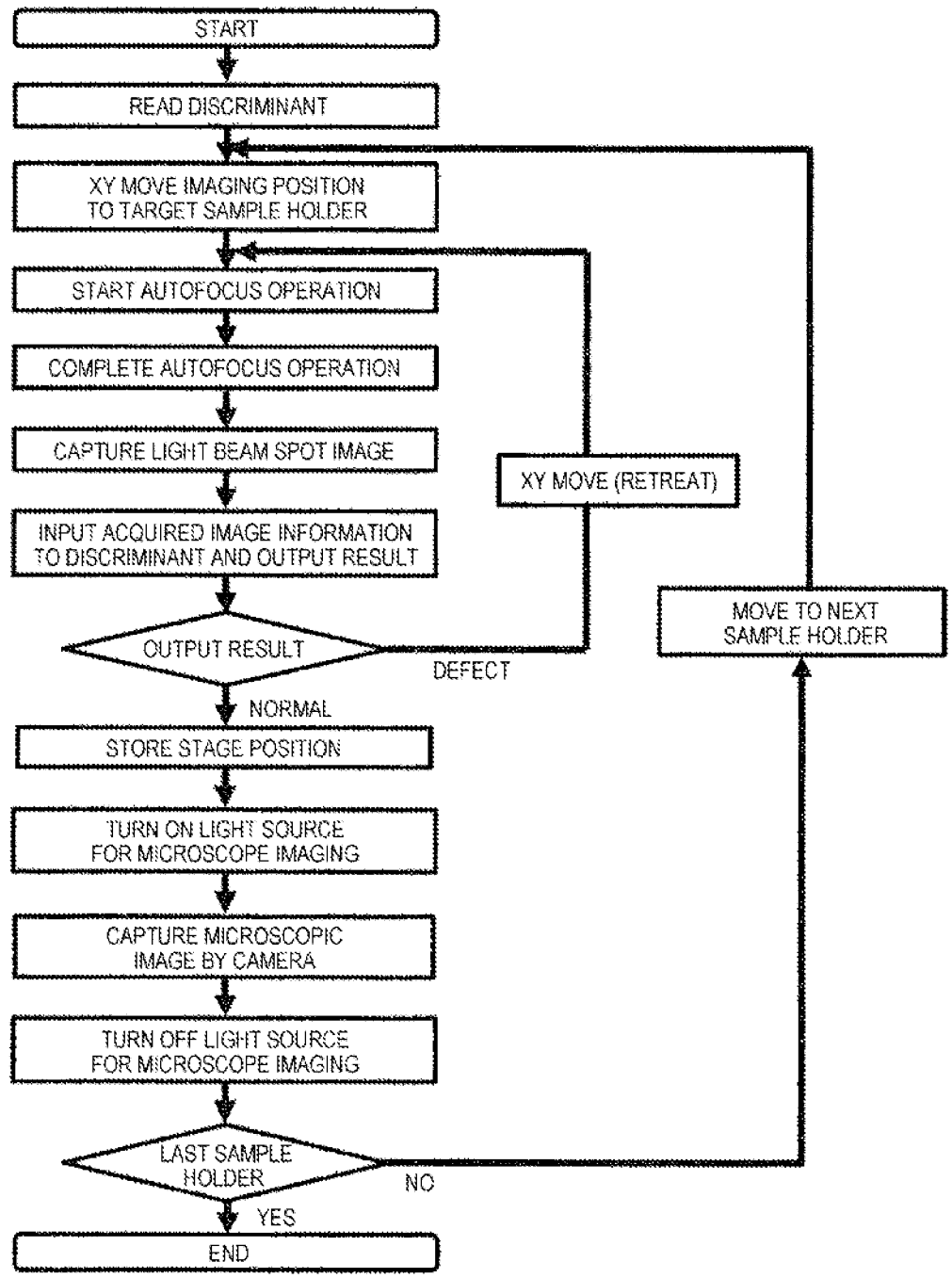

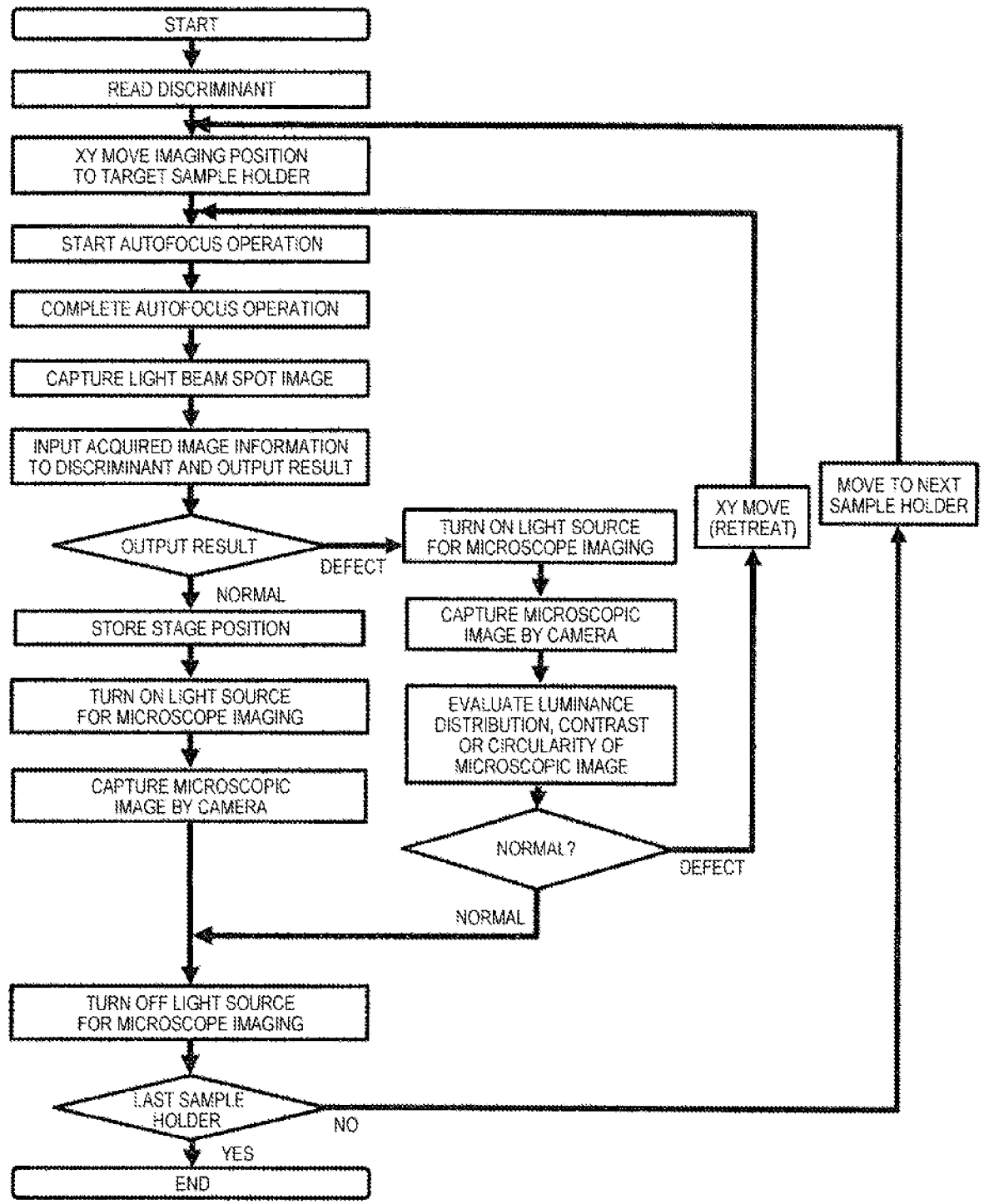

MICROSCOPIC IMAGE CAPTURING METHOD AND MICROSCOPIC IMAGE CAPTURING DEVICE

TECHNICAL FIELD

The present invention relates to a microscopic image capturing method and a microscopic image capturing device.

BACKGROUND ART

As a method for measuring a shape of a fine particle such as a cell in a liquid, there is mainly a light scattering method for analyzing scattering of light and an image imaging method for capturing an image of a particle with a microscope or the like.

The size and number of high-concentration particles can be easily measured according to the light scattering method. Therefore, the light scattering method is generally used as a method for inspecting drug activity against cells and bacteria. For example, a liquid containing bacteria is irradiated with light, incident light is scattered by the bacteria, and attenuation in an amount of transmitted light is measured. Accordingly, a growth state of the bacteria is measured.

As a medical device for bacteria using this principle, there is a device (sensitivity inspection device) that inspects an effect of an antimicrobial agent on bacteria, that is, an effect of inhibiting growth of bacteria by the antimicrobial agent. For example, in a sensitivity inspection device, the number of bacteria is counted using the light scattering method.

However, the light scattering method has low sensitivity and requires culture for one day and night. Culture for a long period of time is required in this way, and thus speeding up of a sensitivity inspection device has been actively studied in recent years.

As a method for achieving speeding up, it is necessary to improve sensitivity. In order to improve sensitivity, a method for increasing an initial culture concentration of bacteria is considered, but the initial concentration of bacteria is determined to be a low concentration of $5 \times 10^5$ CFU/ml by organizations such as the Clinic and Laboratory Standards Institute (CLSI), and the concentration of bacteria cannot be changed.

Regarding improvement in sensitivity in detection of cells and bacteria, the size and number of cells can be detected with high sensitivity according to the image imaging method. Since not only the size and number of cells but also a shape of the cell can be measured regarding to an amount of information, more information can be obtained about a state of the cells than in the light scattering method.

Known means for observing the state of cells according to the image imaging method include optical microscope observation, fluorescence microscope observation, a coherent anti-Stokes Raman scattering (CARS) microscope, three-dimensional optical coherence tomography (OCT), and the like.

In these image imaging methods, it is important to analyze an accurate shape of a cell, and thus it is essential to accurately focus on the cell. In a research stage, manual focus by human hands is often used for focusing. In fields requiring acquisition of a huge amount of images, such as drug discovery and medical care, high-speed and high-accuracy autofocus is essential.

When a microscopic image of a cell is acquired, the cell is suspended in a liquid sample, and a container that is transparent for light to be observed is used as a sample container that accommodates the liquid sample.

It is appropriate to dispose an objective lens below the sample container. The reason is that since the cell to be observed is adhered to a boundary between the sample liquid and the sample container (for example, an inner side of a bottom surface of the sample container), the cell is observed through the sample liquid when the sample is observed from above the sample container, and aberration correction becomes difficult due to a liquid surface of the liquid being a complicated curved surface or the liquid surface being shaken by vibration or convection of air.

When the sample is observed from below the sample container, aberration correction can be easily performed since the sample container is solid and a thickness of the bottom surface is fixed. An inverted microscope that observes a sample container from below is generally used for cell observation. A focus position of the lower objective lens is in the vicinity of a position where the liquid sample is in contact with the sample container. In the liquid sample, the cell is suspended.

There are generally two types of autofocus methods for automatically adjusting a focus position of the objective lens, that is, an image method for calculating a focus position based on contrast of a microscopic image and an optical method for emitting light for autofocus such as a laser and calculating a focus position based on the reflected light.

In autofocus according to the image method, a plurality of microscope images are acquired while changing a position of the objective lens, and a position where contrast is maximized is measured. In this method, in order to complete the autofocus at high speed, a program or a device for calculating contrast at high speed for the plurality of microscope images is required, and it is difficult to improve an autofocus speed in principle. In the microscopic images used for the autofocus, it is necessary to use an object from which contrast can be obtained as an observation target, and the autofocus cannot be performed with a suspension of extremely dilute cells.

On the other hand, in autofocus according to the optical method, a boundary surface between a sample container and a sample liquid is irradiated with light such as a laser, and the autofocus is performed based on information such as a position and a phase of light reflected from the boundary surface (for example, one numerical value or several scalar quantities). Therefore, when a microscopic image having several hundred thousand pixels is acquired, an amount of calculation in the optical method is 1/100,000 or less of that in the image method, and high-speed autofocus can be performed.

Since the autofocus is performed only by the reflected light from the boundary surface between the sample container and the sample liquid, the autofocus can be performed even in a state in which there is no object such as a cell. From the object such as a cell, contrast can be obtained.

Here, regarding application of the autofocus according to the optical method to the microscope, it is important that an autofocus surface of the sample container is a smooth portion in order to reflect light therefrom. Therefore, when there is a defect (such as a protrusion in a pattern) in a focus surface irradiated with light such as a laser for autofocus, a focus position may be greatly deviated from the target focus surface.

Therefore, various methods have been devised in order to avoid a portion having a defect on a focus surface and to perform autofocus on a portion having no defect. PTLs 1 and 2 disclose examples of such a method.

For example, in a method according to PTL 1, a surface shape is acquired and stored in advance by performing autofocus on a surface having no defect and different from a focus surface whose image is to be actually captured, and an image of the focus surface whose image is to be actually captured is captured based on data on the surface shape.

In a method according to PTL 2, four irradiation points of light such as a laser for autofocus are provided on a focus surface on which autofocus is performed, whereby one point where an irradiation point overlaps a portion having a defect is invalidated, and appropriate autofocus control is performed based on the other points.

CITATION LIST

Patent Literature

PTL 1: JP-A-2000-294608
PTL 2: JP-A-2001-305420

SUMMARY OF INVENTION

Technical Problem

In the related art, there is room for improvement in processing for performing autofocus on a portion having no defect.

For example, in the method according to PTL 1, throughput is low since it is necessary to acquire the surface shape in advance.

The method according to PTL 1 cannot be applied to a case where there is no surface having no defect.

In the method according to PTL 2, types of defects that can be determined are limited. For example, in a case where a defect is a protrusion in a designed pattern or the like, it is possible to determine that an irradiation point is invalid data based on a signal from a light reception unit that receives reflected light from the irradiation point, while in a case where a defect is a minute crack or a foreign substance on a focus surface, it is difficult to determine the defect based on a signal of reflected light since a three-dimensional shape or optical characteristics of the defect are different.

In the method according to PTL 2, throughput is low since it is necessary to perform light irradiation and determination at four points in order to complete autofocus control once.

The invention has been made to solve such problems, and an object thereof is to provide a microscopic image capturing method and a microscopic image capturing device capable of improving processing for performing autofocus on a portion having no defect.

Solution to Problem

An aspect of a microscopic image capturing method according to the invention is a microscopic image capturing method for capturing a microscopic image using a microscopic image capturing device.

The microscopic image is a microscopic image of a cell or a particle as a sample in contact with an inner side of a bottom surface of a container.

The microscopic image capturing device includes:
- a transparent container configured to accommodate a sample;
- a light source for microscope imaging;
- a light beam light source configured to emit a light beam toward the inner side of the bottom surface of the container;
- an objective lens used to form a spot image of the light beam reflected by the sample or the container;
- a detector configured to detect the formed spot image; and
- a moving mechanism configured to relatively move the container and the objective lens.

In the method, the microscopic image capturing device further includes a determination unit configured to determine whether the light beam has been applied to a defect based on the spot image.

The microscopic image capturing method includes:
- a step of emitting the light beam from the light beam light source;
- a step of detecting the spot image by the detector;
- a step of focusing the spot image by the moving mechanism moving the objective lens in an optical axis direction of the light beam with respect to the container;
- a step of determining by the determination unit whether the light beam has been applied to a defect based on the spot image,
- a step a) of, when it is determined that the light beam has been applied to the defect, moving by the moving mechanism the container with respect to the objective lens in a direction orthogonal to an optical axis of the light beam according to a prescribed condition; and
- a step b) of, when it is determined that the light beam has not been applied to the defect, capturing a microscopic image of the sample using the light source for microscope imaging.

An aspect of a microscopic image capturing device according to the invention is configured to perform the above-described method.

Advantageous Effects of Invention

According to the microscopic image capturing method and the microscopic image capturing device in the invention, processing for performing autofocus on a portion having no defect is improved.

For example, according to an embodiment of the invention, even on a focus surface having a defect, it is possible to maintain high-accuracy autofocus by avoiding the defect. In addition, it is possible to cope with various defects, and it is possible to cope with unexpected random defects in some cases.

Further features related to the invention are clarified based on description of the present specification and accompanying drawings. In addition, problems, configurations, and effects other than those described above will be clarified by description of the following embodiments.

BRIEF DESCRIPTION OF DRAWINGS

FIG. 2 is a schematic view showing an optical system of the device in FIG. 1.

FIG. 3 is a schematic view showing a measurement method using the device in FIG. 1.

FIG. 4 is a flowchart of autofocus processing of the device according to the first embodiment.

FIG. 7 is another example of the determination criterion according to the first embodiment.

FIG. 8 is a flowchart of processing in a learning stage of the device according to the second embodiment.

FIG. 9 shows examples of a progress image during execution of the autofocus processing.

FIG. 10 is a configuration example of teacher data according to the second embodiment.

FIG. 11 is a flowchart of autofocus processing of the device according to the second embodiment.

FIG. 12 is a flowchart of autofocus processing of the device according to the third embodiment.

DESCRIPTION OF EMBODIMENTS

Hereinafter, embodiments of the invention will be described with reference to the accompanying drawings. Although the accompanying drawings show specific embodiments according to the principle of the invention, the accompanying drawings are shown for a purpose of understanding the invention, and are not to be used for limiting interpretation of the invention.

Each of the following embodiments relates to a microscopic image capturing device. The microscopic image capturing device is a device used to capture a microscopic image, and is, for example, an observation device for observing a sample. Each embodiment relates to a microscopic image capturing method performed by the microscopic image capturing device.

A sample whose image is to be captured as the microscopic image is a cell or a particle. Here, a size of the particle is as desired, and is not limited to that of a fine particle. The sample is accommodated in a transparent sample container and is in contact with an inner side of a bottom surface of the sample container. The sample may be contained in a liquid to form a sample liquid.

Each of the following embodiments relates to a device that automatically acquires a microscopic image of a cell present on a boundary surface between a sample liquid and a bottom surface of a sample container in the sample container by autofocus. Hereinafter, an outline of an observation device common in each embodiment will be described first, and then a measurement method using the observation device in each embodiment will be described.

An XYZ Cartesian coordinate system is set in the following description. A prescribed direction in a horizontal plane is an X direction, a direction orthogonal to the X direction in the horizontal plane is a Y direction, and a direction orthogonal to each of the X and Y directions (that is, a vertical direction) is a Z direction. The Z direction coincides with an optical axis of an objective lens in the following example.

1. Outline of Observation Device

Figure 1:
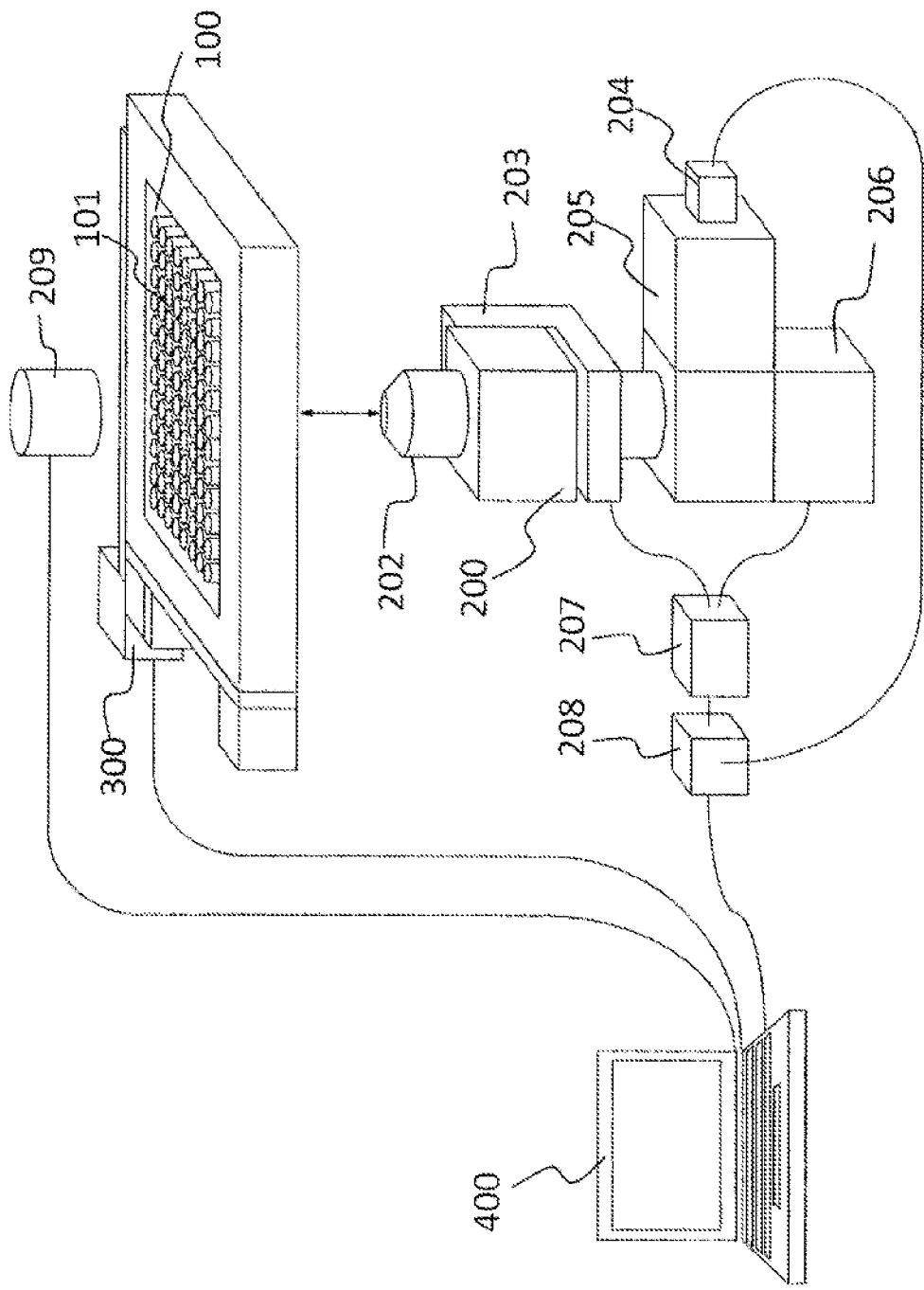
FIG. 1 is a schematic view showing a configuration of a device according to first, second, and third embodiments of the invention.

FIG. 1 shows an overall appearance of the observation device. The observation device functions as the microscopic image capturing device and performs the microscopic image capturing method.

As shown in FIG. 1, the observation device includes a sample container 100 (container), an imaging unit 200, an XY stage 300 (moving mechanism), and a control PC 400. The XY stage 300 relatively moves the sample container 100 and the imaging unit 200 (in particular, an objective lens 202 to be described later) in a plane orthogonal to an optical axis of the imaging unit 200. The XY stage 300 may move the sample container 100, the imaging unit 200, or both.

The sample container 100 may be, for example, a 96-well microtiter plate, or may include a plurality of sample holders 101. A 384-well plate, a 1536-well plate, or the like having more sample holders 101 may be used.

The imaging unit 200 is an optical system of an inverted microscope, and includes the objective lens 202, an objective lens actuator 203 (moving mechanism), a camera 204, an image forming lens 205, an autofocus unit 206, a focus control unit 207, a reflective surface identification unit 208, and an illuminator 209 (light source for microscope imaging).

The objective lens 202 is used to form a spot image of a light beam reflected by a sample or the sample container 100. The objective lens 202 is also used to capture a microscopic image of the sample.

The objective lens actuator 203 relatively moves the sample container 100 and the objective lens 202 in order to perform autofocus. Movement is performed, for example, in parallel with an optical axis of the objective lens 202. The objective lens actuator 203 may move the sample container 100, the objective lens 202, or both.

The image forming lens 205 forms an image of a focus position of the objective lens 202 on the camera 204. The camera 204 converts this image into an electrical signal to detect, for example, a spot image formed by a light beam.

The autofocus unit 206 is an optical unit that acquires a signal for performing autofocus. The autofocus unit 206 includes a light beam light source 215 (to be described later with reference to FIG. 2 and the like) that emits a light beam toward an inner side of a bottom surface of the sample container 100.

The focus control unit 207 adjusts a focus position of the objective lens 202 to the inner side of the bottom surface of the sample container 100 (for example, an inner side of a bottom surface of the sample holder 101) based on the signal from the autofocus unit 206.

The reflective surface identification unit 208 (determination unit) determines whether the light beam has been applied to a defect. For example, when autofocus processing is completed, it is determined whether the autofocus is normal or whether the light beam has been applied to the defect based on a spot image of the light beam on a microscopic image of the camera 204.

The illuminator 209 is provided above the sample container 100. The illuminator 209 is preferably a white or monochromatic LED. The illuminator 209 is a transmissive illuminator in FIG. 1, but may be a reflective illuminator in which a sample is irradiated from directly below the objective lens 202 by a beam splitter or the like. The illuminator 209 emits a light beam toward the inner side of the bottom surface of the sample container 100.

A laser interferometry, a laser reflection method, an astigmatism method, a skew beam method, or the like can be used as the autofocus principle of the autofocus unit 206. The autofocus unit 206 irradiates the bottom surface of the sample holder 101 with light such as a laser through the objective lens 202, and detects reflected light from the bottom surface of the sample holder 101.

The focus control unit 207 determines whether a focus 201 of the objective lens 202 output from the autofocus unit is too close to, too far from, or in focus with a reflective surface from the objective lens 202, and moves the objective lens actuator 203 according to a determination result.

The XY stage 300 moves the sample container 100. In particular, it is desirable to move in a plane perpendicular to the optical axis of the objective lens 202.

The focus control unit 207, the reflective surface identification unit 208, the XY stage 300, and the camera 204 are connected to the control PC 400. Observation is performed by executing the autofocus processing according to a prescribed process and automatically acquiring microscopic images of cells in a sample liquid in the sample container 100. PLC control, a control board, or the like may be used for the control PC 400.

FIG. 2 shows the optical system in a state in which the autofocus is completed. A state is shown in which a bottom surface of one of the plurality of sample holders 101 of the sample container 100 is in focus. A defect 104 is present in a focus portion of the bottom surface (observation surface) of the sample holder 101.

The defect 104 hinders an appropriate operation of the autofocus, and includes, for example, a crack in the sample container 100, a curve of the bottom surface of the sample container 100, a precipitate or an impurity in the sample liquid, unevenness in a pattern formed by the sample, and the like.

Illumination light having a uniform luminance distribution is emitted from the illuminator 209 for obtaining a microscopic image to a field of view of a focus surface, and light from the focus surface is captured by the objective lens 202.

The light in a visible region of the illuminator 209 is reflected by a dichroic mirror 216, and the microscopic image of the focus surface is formed on a sensor of the camera 204 by the image forming lens 205.

When the astigmatism method is used for the autofocus principle, a light beam for autofocus is emitted from the light beam light source 215, becomes parallel light by the collimator lens 214, is emitted from below the dichroic mirror 216 through a beam splitter 213, and is emitted to the bottom surface of the sample holder 101 through the objective lens 202.

Most of the emitted light beam is reflected at a bottom portion of the sample holder 101, and a part of the light beam is scattered by the defect 104. The reflected light beam is reflected by the dichroic mirror 216 and the beam splitter 213.

The light beam reflected by the dichroic mirror 216 forms an image on the sensor of the camera 204 in the same manner as the microscopic image.

The light beam reflected by the beam splitter 213 forms an image on a photodiode 210 (detector) through an image forming lens 211 and a cylindrical lens 212. In this way, the photodiode 210 detects a spot image formed by the light beam. In this example, both the camera 204 and the photodiode 210 function as detectors that detect the spot image of the light beam, but only one of either the camera 204 and the photodiode 210 may function as a detector in a modification.

2. Measurement Method by Observation Device

First Embodiment

FIG. 3 shows a method for continuously capturing images of observation surfaces 103 of the sample holders 101 in which a plurality of sample solutions 102 are stored.

FIG. 3A shows a state at a time point when autofocus processing is started for one observation surface 103 of the plurality of sample holders 101. The autofocus unit 206 irradiates the sample container 100 with a light beam. The objective lens actuator 203 is driven to scan while moving the focus 201 upward. While scanning, luminance of the reflected light of the light emitted from the autofocus unit 206 is continuously detected. At this time, it is desirable that the illuminator 209 (light source for microscope imaging) is turned off.

As shown in FIG. 3B, an accurate focus operation may be performed by the focus control unit 207 at a time point when the autofocus unit 206 detects a peak in the luminance of the reflected light from the observation surface 103. The accurate focus operation may be, for example, a focus operation based on a known technique.

For example, the objective lens actuator 203 moves the objective lens 202 in an optical axis direction of the light beam with respect to the sample container 100, thereby focusing a spot image.

In a state in which the spot image is in focus, the spot image of the light beam is detected and captured by the camera 204. The reflective surface identification unit 208 determines whether the light beam has been applied to a defect based on the captured spot image. A state in which the light beam has been emitted to a defect can be said to be a state in which autofocus is not normally performed, and a state in which the light beam has not been applied to a defect (that is, a state in which the light beam has been applied to a portion that is not defective) can be said to be a state in which autofocus is normally performed.

In FIG. 3C, it is assumed that the light beam has been applied to a defect. In this case, the reflective surface identification unit 208 determines that the light beam has been applied to the defect, and the XY stage 300 moves the sample container 100 with respect to the objective lens 202 in a direction orthogonal to an optical axis of the light beam according to a prescribed condition. Accordingly, the focus 201 moves in an XY plane with respect to the observation surface 103.

In the present embodiment, the "prescribed condition" is not particularly defined. That is, when it is determined that the light beam has been applied to the defect, the XY stage 300 moves the sample container 100 regardless of other conditions. As a modification, this "prescribed condition" may be defined as appropriate (an example will be described in a third embodiment to be described later).

After the movement, the determination may be performed again. For example, the autofocus unit 206 irradiates the sample container 100 with a light beam, the camera 204 detects a spot image of the light beam, the objective lens actuator 203 moves the objective lens 202 to focus the spot image, and the reflective surface identification unit 208 determines whether the light beam has been applied to a defect based on the spot image in focus. In this way, it is possible to avoid defects and search for an appropriate portion.

When it is determined that the light beam has been applied to a defect, the processing may be ended. For example, prescribed error processing may be performed, and the above processing may be performed on the next imaging target (for example, the next sample holder 101).

The determination may be repeated a prescribed upper limit number of times until it is determined that the light beam has not been applied to a defect. For example, when it is determined that the light beam has been repeatedly applied to a defect twice for the same imaging target, the processing may be ended.

When the reflective surface identification unit 208 determines that the light beam has not been applied to a defect, a microscopic image of a sample is captured using the illuminator 209. For example, as shown in FIG. 3D, the objective lens actuator 203 is fixed, a distance between the objective lens 202 and the observation surface 103 is fixed, the observation surface 103 is irradiated illumination with from the illuminator 209, and a microscopic image is acquired by the camera 204.

In this case, the observation device (for example, the reflective surface identification unit 208, and may be another component) may store a state of the moving mechanism at that time point (for example, a position of the XY stage 300 and/or the objective lens actuator 203). In this way, a microscopic image can be acquired again at the same position later, which is suitable for a case of observing a change in the sample over time, and the like.

FIG. 4 shows an operation flowchart of the above-described measurement method. This flowchart includes steps performed in the measurement method described above. When a change over time is observed (this is useful when the sample is a biological sample, for example), a series of operations may be repeated at time intervals as desired.

FIG. 5 shows variations of spot images of a light beam. FIG. 5A is an example of a spot image of the light beam in a case where the light beam has not been applied to a defect (that is, in a case where autofocus is normally operated). When a pattern of the spot image of the light beam deviates from a pattern in FIG. 5A, it can be considered that the light beam has been applied to a defect.

Figure 5C:
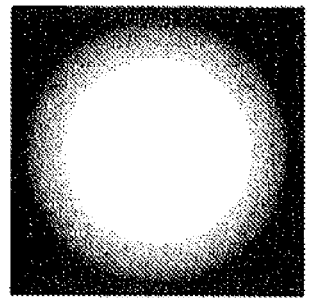
FIG. 5 is a view showing variations of spot images.
Figure 5F:
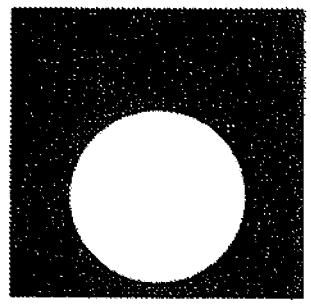
Figure 5B:
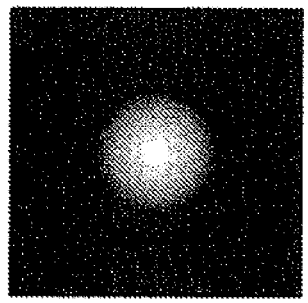
Figure 5E:
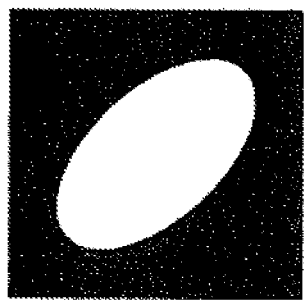
Figure 5A:
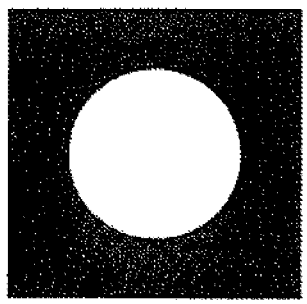
Figure 5D:
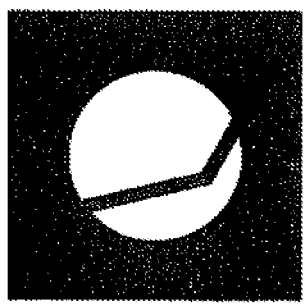

Sizes of spot images in FIGS. 5B and 5C are different from that in FIG. 5A. FIG. 5D shows a state in which an image of a defect is reflected in a spot image. FIG. 5E shows that a spot image is elliptical and a surface irradiated with the light beam is distorted. FIG. 5F shows that a spot image is translated and a surface irradiated with the light beam is inclined.

Figure 6:
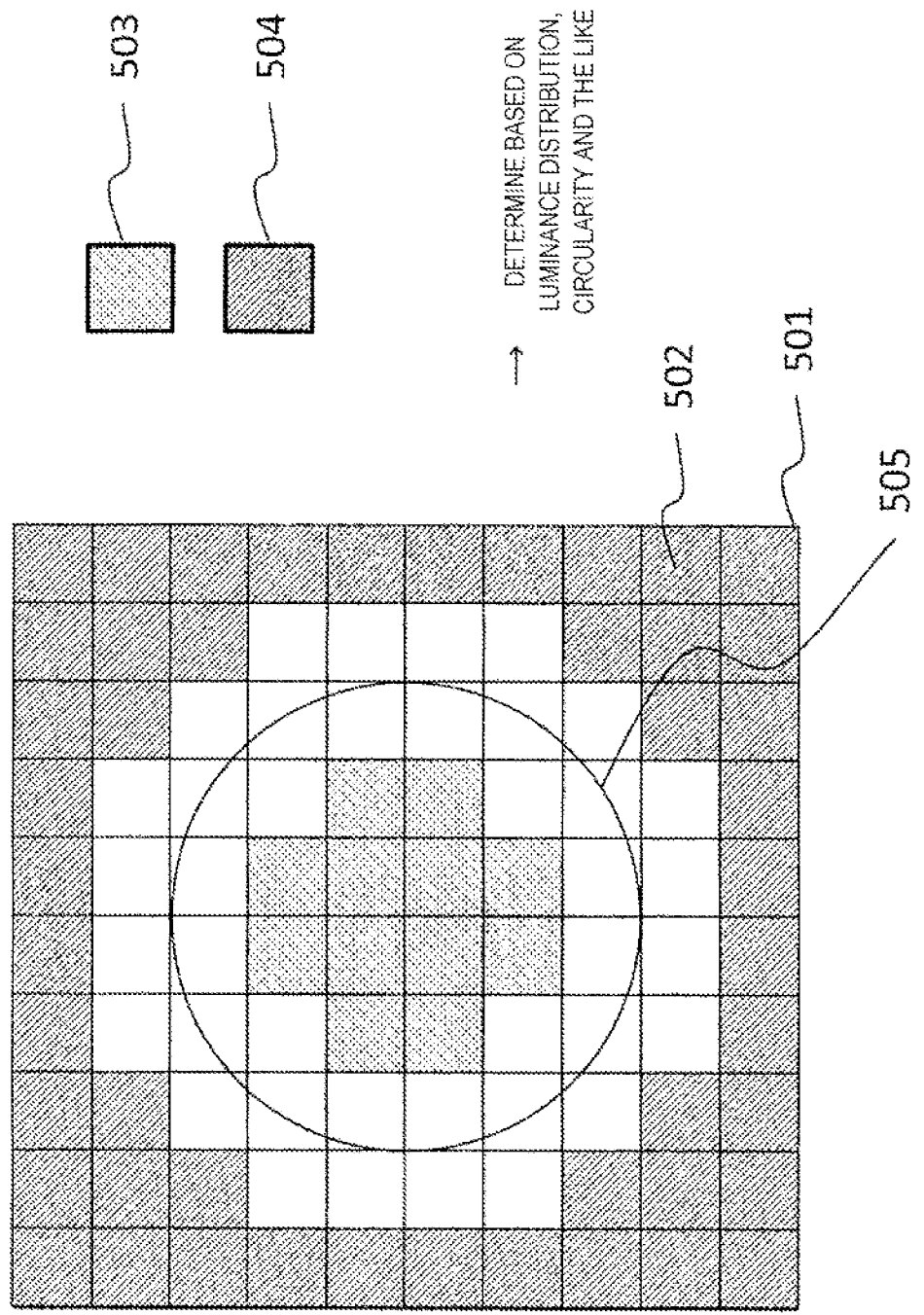
FIG. 6 is an example of a determination criterion according to the first embodiment.

FIG. 6 shows an example of a criterion for determining whether a light beam has been applied to a defect. Luminance distribution of a spot image is used in this example. As shown in FIG. 4, such a determination criterion can be acquired at a start of the processing.

An image 501, as a spot image of a light beam, captured by the camera 204 in FIG. 1, is represented by data in which luminance values of individual pixels 502 are two-dimensionally arranged. An outer shape 505 of the light beam in FIG. 6 is defined in advance corresponding to a state in which the light beam has not been applied to the defect as shown in FIG. 5A.

A pixel 503 inside the outer shape 505 and a pixel 504 outside the outer shape 505 are defined in association with the outer shape 505. In this example, the inner pixel 503 is a pixel spaced inward from the outer shape 505 by a prescribed distance or larger, and the outer pixel. 504 is a pixel spaced outward from the outer shape 505 by a prescribed distance or larger.

In a state in which the light beam has not been applied to the defect, it is considered that luminance of the inner pixel 503 is high and luminance of the outer pixel 504 is low. Therefore, when luminance of all the inner pixels 503 is equal to or greater than a prescribed inner luminance threshold and luminance of all the outer pixels 504 is equal to or smaller than a prescribed outer luminance threshold, it can be determined that the light beam has not been applied to a defect.

Otherwise, that is, when luminance of any one of the inner pixels 503 is smaller than the inner luminance threshold or luminance of any one of the outer pixels 504 exceeds the outer luminance threshold, it can be determined that the light beam has been applied to a defect.

According to such a determination method, it is possible to detect a state in which the light beam has been applied to the defect as shown in each of FIG. 5B to FIG. 5F.

Since the number of pixels of the spot image is smaller than the number of pixels of the microscopic image, the determination can be efficiently performed.

As another example of the determination criterion, circularity of a spot image may be used. For example, the outer shape 505 is acquired for the spot image, and the circularity of the spot image is evaluated. Any known method can be used for the evaluation of the circularity. When the circularity is high, it is determined that the light beam has not been applied to a defect, and when the circularity is low, it is determined that the light beam has been applied to a defect.

FIG. 7 shows still another example of the determination criterion. Luminance distribution of a spot image is used in this example. In FIG. 7A, a horizontal axis represents a position of a pixel by a distance from a center of the spot image, and a vertical axis represents luminance. In a state in which a light beam has been applied to a defect, it is considered that the luminance of the pixel at the center is high, and the luminance decreases as the distance from the center increases. For this reason, in the example in FIG. 7A, an appropriate range of the luminance of the pixel at the center is defined as a range in which the luminance is high, and an appropriate range of the luminance of the pixel in a periphery is defined as a range in which the luminance is low.

When the luminance of all the pixels is within the appropriate range, it is determined that the light beam has not been applied to a defect. Otherwise, that is, when the luminance of any pixel is inappropriate (excessively large or excessively small), it is determined that the light beam has been applied to a defect.

The example in FIG. 7B is an example in which an influence of a diffraction image in the spot image is further taken into consideration. A concentric diffraction image may appear superimposed on the spot image, and an appropriate range changes stepwise in consideration of a change in luminance due to the diffraction image. In this way, it is possible to perform the determination with higher accuracy by including the luminance of the concentric diffraction image in the spot image in the luminance distribution.

These determination criteria can be used alone or in combination of two or more. In addition, these determination criteria can each be expressed as a discriminant including an inequality sign.

The reflective surface identification unit 208 may determine whether a light beam has been applied to a defect based on a plurality of spot images (for example, which will be described later with reference to FIG. 9) detected during execution of the autofocus processing. In this case, the determination may be performed individually for each spot image, and the final determination may be performed based on the results, or the determination may be performed once based on the luminance distribution or the circularity of each spot image. Accuracy of the determination is improved using the plurality of spot images in this way.

As described above, according to a microscopic image capturing method and a microscopic image capturing device according to the first embodiment, the processing for performing autofocus on a portion having no defect is improved.

For example, even on a focus surface having a defect, it is possible to maintain high-accuracy autofocus by avoiding the defect. In addition, it is possible to cope with various defects, and it is possible to cope with unexpected random defects in some cases.

Second Embodiment

In the first embodiment, the criterion for determining whether the light beam has been applied to the defect is prepared in advance. In a second embodiment, a more appropriate determination criterion can be acquired by generating the determination criterion by machine learning. Hereinafter, the second embodiment will be described. Description of the same points as those in the first embodiment may be omitted.

In the second embodiment, the reflective surface identification unit 208 learns a criterion for determining whether a light beam has been applied to a defect based on a plurality of data including a microscopic image and a spot image of the light beam.

First, processing in a learning stage will be described. In the learning stage, first, teacher data is generated, and learning is performed using the generated teacher data.

FIG. 8 shows a flowchart of the processing in the learning stage of the device according to the second embodiment. The observation device generates N teacher data (N is an integer greater than 1). N is desirably 1000 or greater.

In the generation of the teacher data, the device acquires, for each teacher datum, one microscopic image and one or more spot images of a light beam corresponding to the microscopic image. In a case where a plurality of spot images correspond to one microscopic image, the spot images may be a series of images (process images) at different stages of an autofocus operation (during a progress, at a completion time point, and the like of the autofocus operation). With such a configuration, it is possible to perform learning using spot images at various stages.

FIG. 9 shows examples of a progress image during execution of the autofocus processing. FIG. 9A shows progress images in a case where autofocus is normally operated, that is, corresponds to teacher data in a case where a light beam has not been applied to a defect. FIG. 9A(1) is a spot image when the autofocus is completed (for example, when the objective lens 202 is at an appropriate position). FIG. 9A(2) is a spot image when the objective lens 202 is 10 μm frontward of an autofocus completion position. FIG. 9A(3) is a spot image when the objective lens 202 is 20 μm frontward of the autofocus completion position.

FIG. 9B shows examples of the progress image in a case where a light beam has been applied to a defect, that is, corresponds co teacher data in the case where the light beam has been applied to the defect. A relationship between each image and the autofocus processing in FIG. 9B is the same as that in FIG. 9A. In this way, in the examples in FIG. 9, each teacher datum includes one microscopic image and a plurality of spot images in which the position of the objective lens 202 is changed.

It is desirable to record each progress image until the autofocus processing is completed in association with a position of the objective lens actuator 203 (for example, a relative position with respect to a position where the autofocus processing is completed) or a time point (for example, a relative time point with respect to a time point when the autofocus processing is completed).

FIG. 10 shows an example of the teacher data according to the second embodiment configured as described above. Each teacher datum includes a label (correct label) indicating whether a light beam has been applied to a defect ("defect" in FIG. 10) or not ("normal" in FIG. 10). A method for determining the label is not limited, and the label may be given by a person, or may be automatically determined by the reflective surface identification unit 208 or other components. In the present embodiment, the reflective surface identification unit 208 automatically determines the label as follows.

In the present embodiment, the reflective surface identification unit 208 determines, for each teacher datum, a label of the teacher datum based on a microscopic image included in the teacher datum. For example, the label is determined based on one or more of luminance distribution (that may include information on a luminance centroid), contrast, circularity, and the like of the microscopic image. In this way, it is possible to appropriately determine the label for each teacher datum.

A case of using contrast will be described as a specific example. The reflective surface identification unit 208 calculates the contrast of the microscopic image included in the teacher datum. The contrast can be calculated using, for example, a known technique. Next, the reflective surface identification unit 208 compares the calculated contrast with a prescribed threshold. This threshold can be specified in advance as a reference value corresponding to a case where autofocus is normally operated, for example.

In a case where the calculated contrast is greater than the threshold, the teacher datum including the microscopic image is labeled as teacher data in a case where a light beam has not been applied to a defect (that is, autofocus is normally completed). In contrast, when the calculated contrast is equal to or smaller than the threshold, the teacher data including the microscopic image is labeled that a light beam has been applied to a defect.

As described above, N teacher data are generated. After the label is assigned to the teacher datum, the microscopic image may be excluded from the teacher datum.

The reflective surface identification unit 208 performs learning using the generated teacher data. For example, each of the spot images included in the teacher datum is used as an input, a label is used as an output, and learning is performed such that correct output is performed for the input (that is, such that a label output by the reflective surface identification unit 208 for the spot image matches the correct label associated with the spot image).

A specific configuration of a learning model and specific processing of learning can be designed by a person skilled in the art as desired, and for example, a support vector machine (SVM), a neural network, deep learning, or the like can be used.

In this way, learning is performed, and a learned model is generated. The reflective surface identification unit 208 includes the generated learned model.

FIG. 11 is a flowchart of autofocus processing by the device according to the second embodiment. The processing according to the second embodiment can be executed in the same manner as the first embodiment except that the determination criterion (discriminant) to be used is generated by machine learning as described above.

As described above, according to a microscopic image capturing method and a microscopic image capturing device in the second embodiment, it is possible to learn an appropriate determination criterion by machine learning. Also in the second embodiment, the same effects as in the first embodiment can be attained.

Third Embodiment

A third embodiment partially changes the operation when it is determined in the first embodiment or the second embodiment that the light beam has been applied to the defect. Hereinafter, the third embodiment will be described.

Description of the same points as those in the first embodiment or the second embodiment may be omitted.

As long as the accuracy of the determination by the reflective surface identification unit 208 is not strictly 100%, it may be erroneously determined that the light beam has been applied to the defect even if the autofocus is actually completed normally. In such a case, movement of the sample container 100 by the XY stage 300 is not actually necessary, but such movement is performed in the first embodiment. The third embodiment reduces such unnecessary movement.

FIG. 12 is a flowchart of autofocus processing of the device according to the third embodiment. When it is determined that a light beam has been applied to a defect, the reflective surface identification unit 208 further performs re-determination based on a microscopic image.

Specifically, in the re-determination processing, the reflective surface identification unit 208 captures a microscopic image of a sample using the illuminator 209 (light source for microscope imaging). Then, the reflective surface identification unit 208 determines whether an image of the defect has been captured based on the microscopic image.

In this determination, for example, it is possible to determine whether the image of the defect has been captured based on luminance distribution (that may include information on a luminance centroid), contrast, or circularity of the microscopic image. A determination criterion in this case can be determined in the same manner as the criterion used for determining the label of the teacher datum in the second embodiment. By using such a determination criterion, it is possible to appropriately determine whether the image of the defect has been captured.

When it is determined that the image of the defect is not captured (that is, image capturing is normally completed), the observation device ends image capturing processing on the sample (for example, turns off the illuminator 209). In this case, the microscopic image of the sample may be captured again.

In contrast, when it is determined that the image of the defect has been captured, the moving mechanism (for example, the XY stage 300 and/or the objective lens actuator 203) moves the sample container 100 with respect to the objective lens 202 in a direction orthogonal to an optical axis of the light beam. This processing corresponds to the processing in the case where it is determined in the first embodiment that the light beam has been applied to the defect. Thereafter, the autofocus processing is executed again.

As described above, according to a microscopic image capturing method and a microscopic image capturing device in the third embodiment, in a case where it is erroneously determined that the light beam has been applied to the defect even though the autofocus is actually operated normally, unnecessary re-autofocus processing can be omitted. Also in the third embodiment, the same effects as in the first embodiment can be attained.

REFERENCE SIGNS LIST 100 sample container (container)
101 sample holder
102 sample solution
103 observation surface
104 defect
200 imaging unit
201 focus
202 objective lens
203 objective lens actuator (moving mechanism)
204 camera (detector)
205, 211 image forming lens
206 autofocus unit
207 focus control unit
208 reflective surface identification unit (determination unit)
209 illuminator (light source for microscope imaging)
210 photodiode (detector)
212 cylindrical lens
213 beam splitter
214 collimator lens
215 light beam light source
216 dichroic mirror
300 XY stage (moving mechanism)
501 image
502, 503, 504 pixel
505 outer shape

The invention claimed is:

1. A microscopic image capturing method for capturing microscopic image using a microscopic image capturing device, wherein
the microscopic image is a microscopic image of a cell or a particle as a sample in contact with an inner side of a bottom surface of a container,
the microscopic image capturing device includes
a transparent container configured to accommodate a sample,
a light source for microscope imaging,
a light beam light source configured to emit a light beam toward the inner side of the bottom surface of the container,
an objective lens used to form a spot image of the light beam reflected by the sample or the container,
a detector configured to detect the formed spot image, and
a moving mechanism configured to relatively move the container and the objective lens, and
in the method, the microscopic image capturing device further includes a determination unit configured to determine whether the light beam has been applied to a defect based on the spot image,
the microscopic image capturing method comprising:
a step of emitting the light beam from the light beam light source;
a step of detecting the spot image by the detector;
a step of focusing the spot image by the moving mechanism moving the objective lens in an optical axis direction of the light beam with respect to the container;
a step of determining by the determination unit whether the light beam has been applied to a defect based on the spot image,
a step a) of, when it is determined that the light beam has been applied to the defect, moving by the moving mechanism the container with respect to the objective lens in a direction orthogonal to an optical axis of the light beam according to a prescribed condition; and
a step b) of, when it is determined that the light beam has not been applied to the defect, capturing a microscopic image of the sample using the light source for microscope imaging.

2. The microscopic image capturing method according to claim 1, further comprising:
when it is determined that the light beam has been applied to the defect in a), after the step of moving by the moving mechanism the container with respect to the objective lens in the direction orthogonal to the optical axis of the light beam,
a step of emitting the light beam from the light beam light source;
a step of detecting the spot image by the detector;
a step of focusing the spot image by the moving mechanism moving the objective lens in the optical axis direction of the light beam with respect to the container; and
a step of determining by the determination unit whether the light beam has been applied to a defect based on the spot image.

3. The microscopic image capturing method according to claim 1, wherein
the determination unit determines whether the light beam has been applied to the defect based on luminance distribution or circularity of the spot image.

4. The microscopic image capturing method according to claim 3, wherein
the luminance distribution is luminance distribution including luminance of a concentric diffraction image in the spot image.

5. The microscopic image capturing method according to claim 1, wherein
the determination unit learns a criterion for determining whether the light beam has been applied to the defect based on a plurality of teacher data including the microscopic image and the spot image.

6. The microscopic image capturing method according to claim 5, wherein
each teacher datum includes one microscopic image and a plurality of spot images in which a position of the objective lens is changed.

7. The microscopic image capturing method according to claim 5, wherein
each teacher datum includes a label indicating whether the light beam has been applied to the defect, and
the determination unit determines, for each teacher datum, the label of the teacher datum based on a microscopic image included in the teacher datum.

8. The microscopic image capturing method according to claim 7, wherein
the determination unit determines the label based on luminance distribution, contrast, or circularity of the microscopic image.

9. The microscopic image capturing method according to claim 1, wherein
when it is determined that the light beam has not been applied to the defect in b), the microscopic image capturing device stores a state of the moving mechanism at that time point.

10. The microscopic image capturing method according to claim 1, wherein
the determination unit determines whether the light beam has been applied to the defect based on a plurality of spot images detected during execution of autofocus processing.

11. The microscopic image capturing method according to claim 1, further comprising:
when it is determined that the light beam has been applied to the defect in a),
a step of capturing a microscopic image of the sample using the light source for microscope imaging;
a step of determining by the determination unit whether an image of the defect has been captured based on the microscopic image; and
a step of, when it is determined that the image of the defect has been captured, moving by the moving mechanism the container with respect to the objective lens in the direction orthogonal to the optical axis of the light beam.

12. The microscopic image capturing method according to claim 11, wherein
the determination unit determines whether the image of the defect has been captured based on luminance distribution, contrast, or circularity of the microscopic image.

13. A microscope image imaging device configured to perform the method according to claim 1.

* * * * *